(12) United States Patent
Gretz

(10) Patent No.: US 11,258,243 B1
(45) Date of Patent: Feb. 22, 2022

(54) VAPOR BARRIER COVER FOR SEALING AN ELECTRICAL BOX AGAINST AIR INFILTRATION

(71) Applicant: Arlington Industries, Inc., Scranton, PA (US)

(72) Inventor: Thomas J. Gretz, Delray Beach, FL (US)

(73) Assignee: ARLINGTON INDUSTRIES, INC., Scranton, PA (US)

( * ) Notice: Subject to any disclaimer, the term of this patent is extended or adjusted under 35 U.S.C. 154(b) by 0 days.

(21) Appl. No.: 16/998,104

(22) Filed: Aug. 20, 2020

Related U.S. Application Data

(60) Provisional application No. 62/911,240, filed on Oct. 5, 2019.

(51) Int. Cl.
*H02G 3/08* (2006.01)

(52) U.S. Cl.
CPC ............. *H02G 3/088* (2013.01); *H02G 3/081* (2013.01)

(58) Field of Classification Search
CPC .......... H02G 3/08; H02G 3/081; H02G 3/088; H02G 3/10; H02G 3/12; H02G 3/14; H05K 5/00; H05K 5/02; H05K 5/03; H05K 5/0213
USPC ... 174/66, 67, 480, 481, 484, 485, 554, 564, 174/57; 220/241, 242, 3.2–3.9; 248/906
See application file for complete search history.

(56) References Cited

U.S. PATENT DOCUMENTS

| | | | | |
|---|---|---|---|---|
| 4,408,695 A | * | 10/1983 | Balkwill | H02G 3/088 174/57 |
| 4,757,158 A | * | 7/1988 | Lentz | H02G 3/088 174/53 |
| 4,794,207 A | * | 12/1988 | Norberg | H02G 3/125 174/505 |
| 4,927,039 A | * | 5/1990 | McNab | H02G 3/125 174/57 |
| 4,952,754 A | * | 8/1990 | Rye | H02G 3/088 174/53 |
| 5,763,831 A | * | 6/1998 | Shotey | H02G 3/14 174/67 |
| D462,939 S | | 9/2002 | Dinh | |
| 6,596,938 B2 | * | 7/2003 | Gilleran | H02G 3/088 174/50 |
| 6,858,802 B2 | | 2/2005 | Hagarty et al. | |
| 7,674,974 B1 | * | 3/2010 | Shotey | H02G 3/123 174/53 |
| 8,610,004 B2 | * | 12/2013 | Solan | H02G 3/14 174/502 |
| D698,737 S | | 2/2014 | Hagarty | |
| 8,933,331 B1 | * | 1/2015 | Gretz | H02G 3/121 174/50 |
| D774,467 S | | 12/2016 | Maccarone | |
| 9,883,602 B2 | * | 1/2018 | Coscarella | H05K 5/069 |

(Continued)

*Primary Examiner* — Angel R Estrada

(57) ABSTRACT

A vapor barrier cover for installation to an electrical box in the rough-in phase of construction. The vapor barrier cover includes a flange with an opening having an inner periphery and a body extending from the inner periphery of the flange. The body includes walls extending to a front edge. A front wall extending from the front edge includes a front opening and a rearward extending wing. Installation of the vapor barrier cover enables inspection and testing for air-tightness around the periphery of the electrical box prior to the final phase of construction and without the need for a gasket.

6 Claims, 9 Drawing Sheets

(56) References Cited

U.S. PATENT DOCUMENTS 10,916,926 B2\* 2/2021 Jones ..................... H05K 5/06
2008/0236859 A1 10/2008 de la Borbolla \* cited by examiner

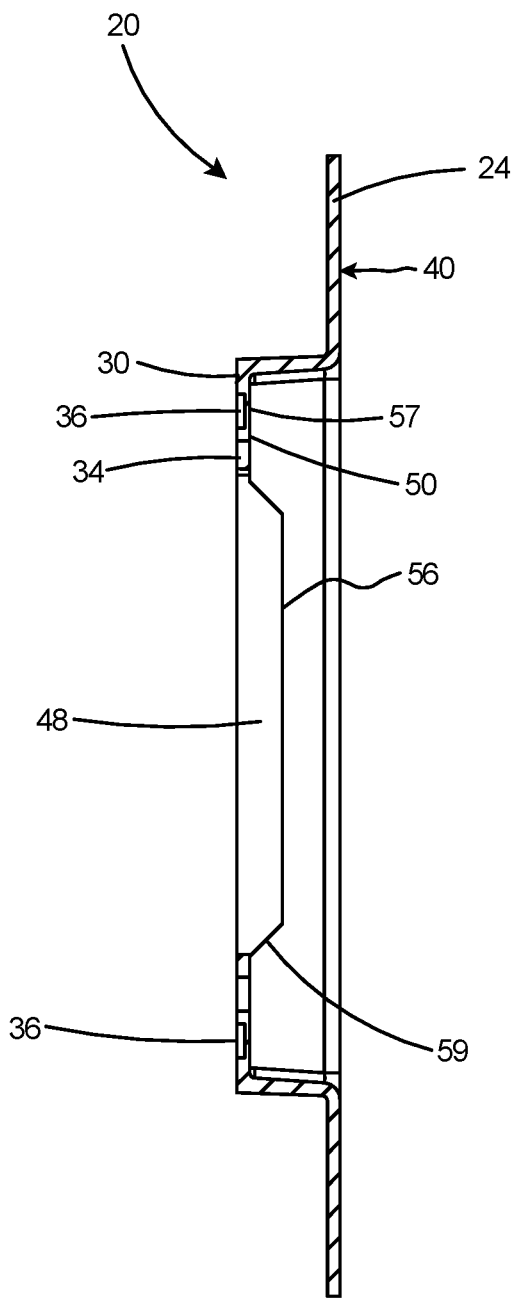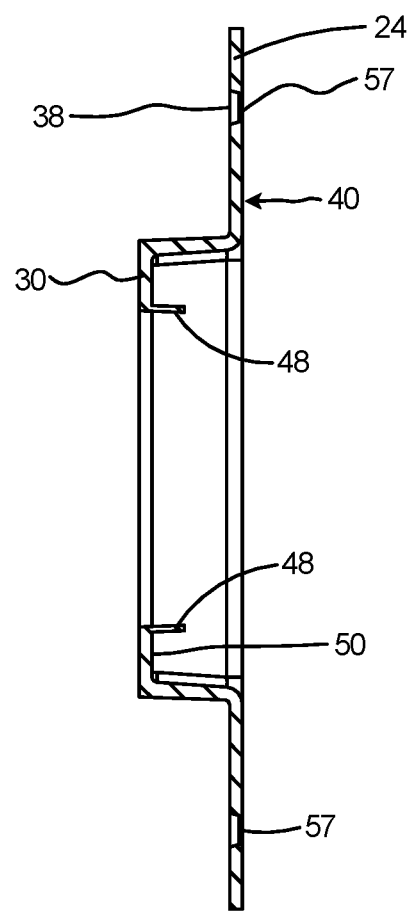
Fig. 6
Fig. 7

VAPOR BARRIER COVER FOR SEALING AN ELECTRICAL BOX AGAINST AIR INFILTRATION

This application claims the priority of Provisional U.S. Patent Application Ser. No. 62/911,240 filed Oct. 5, 2019, the contents of which are incorporated herein by reference.

FIELD OF THE INVENTION

The present invention relates to electrical supply boxes and, and more specifically, to a vapor barrier cover for preventing air infiltration around or through an electrical box.

BACKGROUND OF THE INVENTION

In the home building and remodeling trades, the term "rough-in" refers to the stage of construction after the basic framing and the initial wiring and plumbing installations are completed, but before the installation of drywall. This is the point at which much of this work is first reviewed by the building inspector. The absence of wall and floor coverings allows for easier modification if the rough-in does not pass inspection or if the homeowner makes a change order to alter the project.

With regards to the installation of electrical service, a rough-in means that all electrical cables have been pulled through framing members and other framing members and the cables have been inserted into the wall and ceiling boxes. But at the rough-in phase the light switches, outlets, lights, and other electrical devices are not attached. The inspection of that aspect of the work occurs during the final inspection.

Unfortunately, since drywall has not yet been installed, air infiltration cannot be measured during the rough-in phase. Furthermore, the openings cut in the drywall by the installers during the final phase of construction are typically cut larger than the front periphery of the electrical boxes to allow the front of the box to protrude through the drywall in order to be approximately flush with the eventual wall or ceiling surface.

Although various covers have been proposed for reducing air flow around the electrical box, they are typically installed in the final phase of construction, over the electrical box and the surrounding drywall. Unfortunately, this method of reducing air infiltration creates another phase of work after the final phase as the installers must cover each electrical box with an intermediate air infiltration device over each installed electrical box.

Accordingly, what is needed is a means for sealing around each electrical box during the rough-in phase of construction. Such a device would be installed by the electricians while they are on the job during the rough-in phase, thereby eliminating the need to reschedule the electricians in order to install an air prevention device during the final phase of construction.

BRIEF SUMMARY OF THE INVENTION

The current invention is a vapor barrier cover for the rough-in phase of construction. The vapor barrier cover provides a means of sealing the electrical box against air infiltration prior to the final phase of construction and without the need for a gasket. The vapor barrier cover includes a flange with an opening having an inner periphery and a body extending from the inner periphery of the flange. The body includes side walls and end walls extending to a front edge and a front wall extending inward from the front edge. The front wall includes a front opening and a rearward extending wing.

OBJECTS AND ADVANTAGES

One object of the invention is to prevent air infiltration around an electrical box without the need for a gasket.

A further object of the invention is to provide a device for sealing the openings around electrical boxes prior to the final phase of construction.

A further object of the invention is to enable easier modification if the rough-in does not pass inspection or if the homeowner makes a change order to alter the project.

Another object of the invention is to provide a means for sealing around each electrical box during the rough-in phase of construction, thereby eliminating the need to reschedule the electricians in order to install an air prevention device during the final phase of construction.

These and other objects and advantages of the present invention will be better understood by reading the following description along with reference to the drawings.

BRIEF DESCRIPTION OF THE SEVERAL VIEWS OF THE DRAWING(S)

Reference is made herein to the accompanying drawings, which are not necessarily drawn to scale, and wherein:

FIG. 6 is a sectional view of the vapor barrier cover taken along line 6-6 of FIG. 3.

FIG. 7 is a sectional view of the vapor barrier cover taken along line 7-7 of FIG. 3.

DETAILED DESCRIPTION

Figure 1:
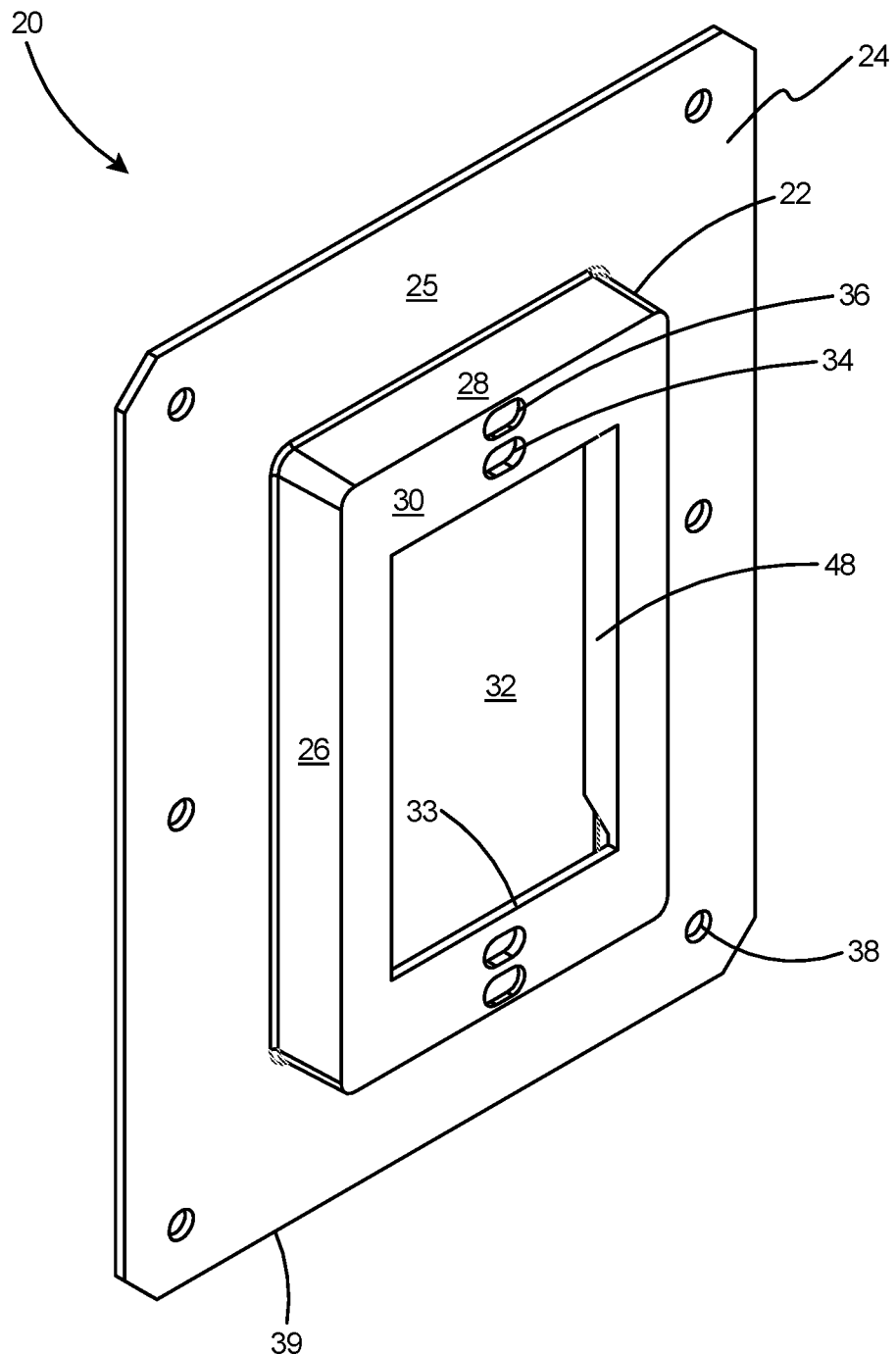
FIG. 1 is a front isometric view of a vapor barrier cover in accordance with embodiments of the invention.

With reference to FIG. 1, the present invention is a vapor barrier cover 20 for covering a single-gang electrical box and providing a seal between the electrical box and the drywall. The vapor barrier cover 20 includes a body 22 and a flange 24 having a planar front surface 25. Two side walls 26 and two end walls 28 project outward from the flange 24 to a planar front wall 30 having a planar surface and a front opening 32. The front opening 32 is defined by an inner periphery 33 that is an orthogonal rectangle and includes four planar uninterrupted edges. The meaning of the term "uninterrupted edges" as used herein is that there are no deviations in the planar edges such as notches or projections. An inner aperture 34 and flashed-over aperture 36 are provided in the front wall 30. Inner aperture 34 extends through the front wall 30 while flashed-over aperture 36 is skinned-over on the rear surface of the front wall, as will be described herein. One or more flashed-over apertures 38 are provided around the perimeter of the flange 24 near the outer edge 39 of the flange. The flashed-over aperture 38 on the flange 24 is skinned-over on the rear surface of the flange 24.

Figure 2:
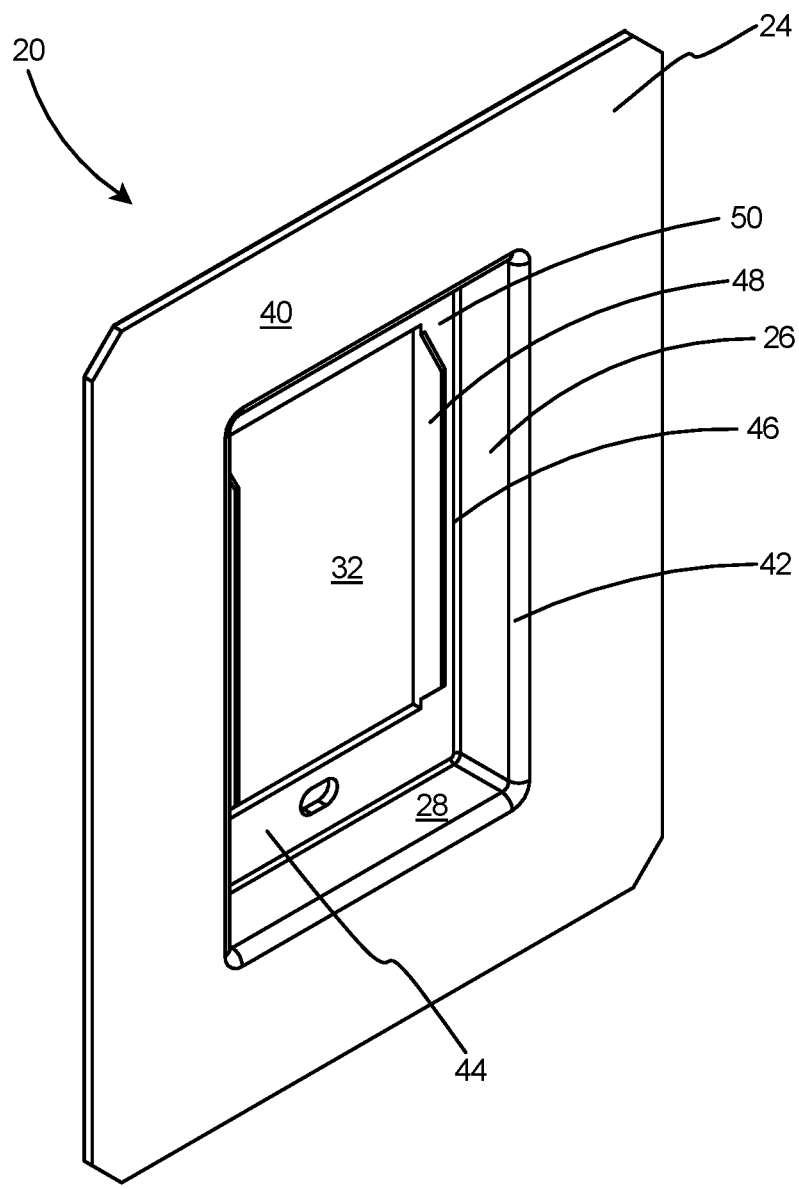
FIG. 2 is a rear isometric view of the vapor barrier cover.

Referring to FIG. 2, the flange 24 includes a planar rear face 40 with a rear opening 42 therein. The side walls 26, end walls 28, and the planar rear surface 44 of the front wall 30 form a channel 46 within the vapor barrier cover 20. Two wings 48 extend from the front wall 30 at the inner periphery 33 of the front opening 32. Channel 46 includes a planar channel bottom 50. When fitted to an electrical outlet box (not shown), the wings 48 will function to center the vapor barrier cover on the outlet box and the channel bottom 50 will abut the front edge of the outlet box in a flush fit.

Figure 3:
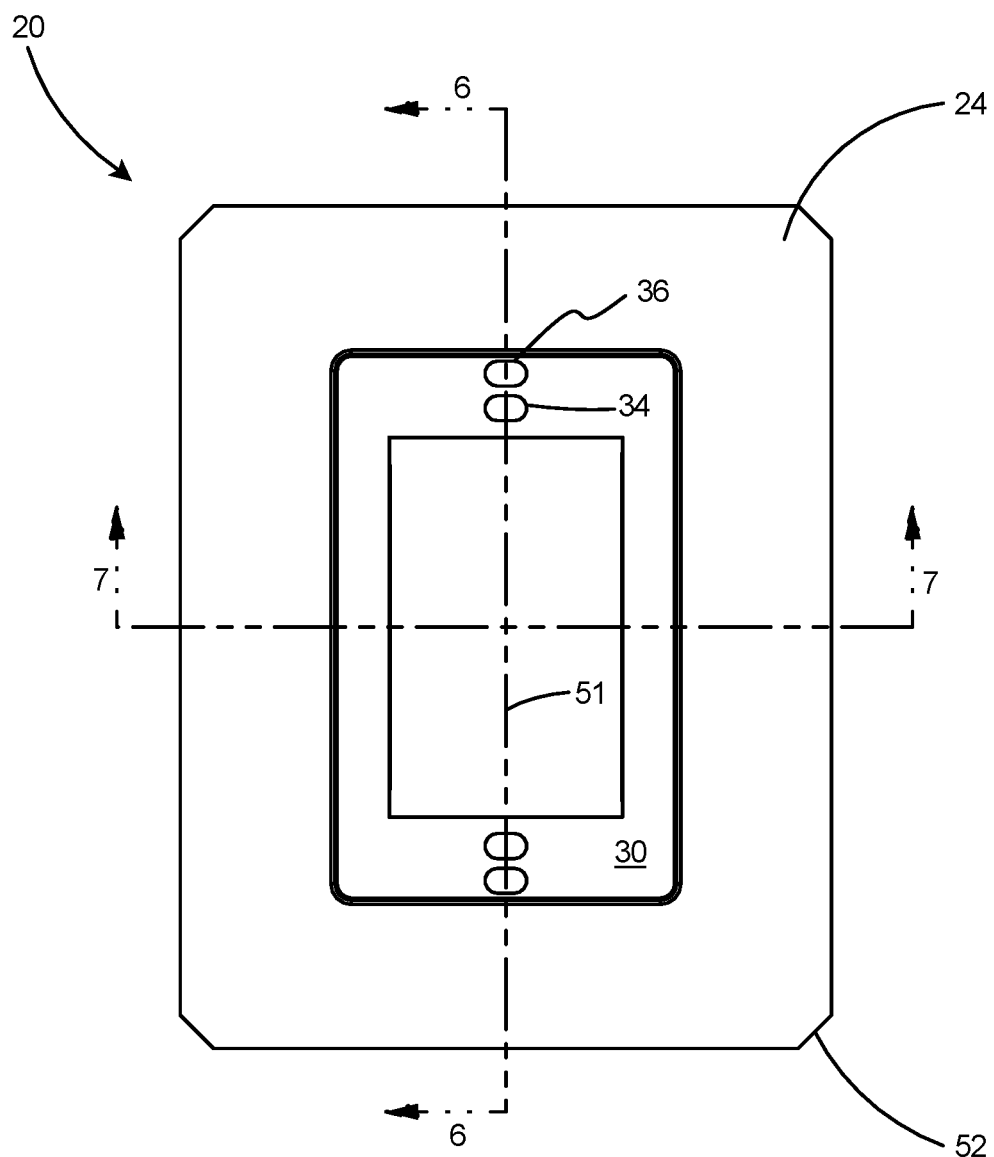
FIG. 3 is a front elevation view of the vapor barrier cover.
Figures 4, 5:
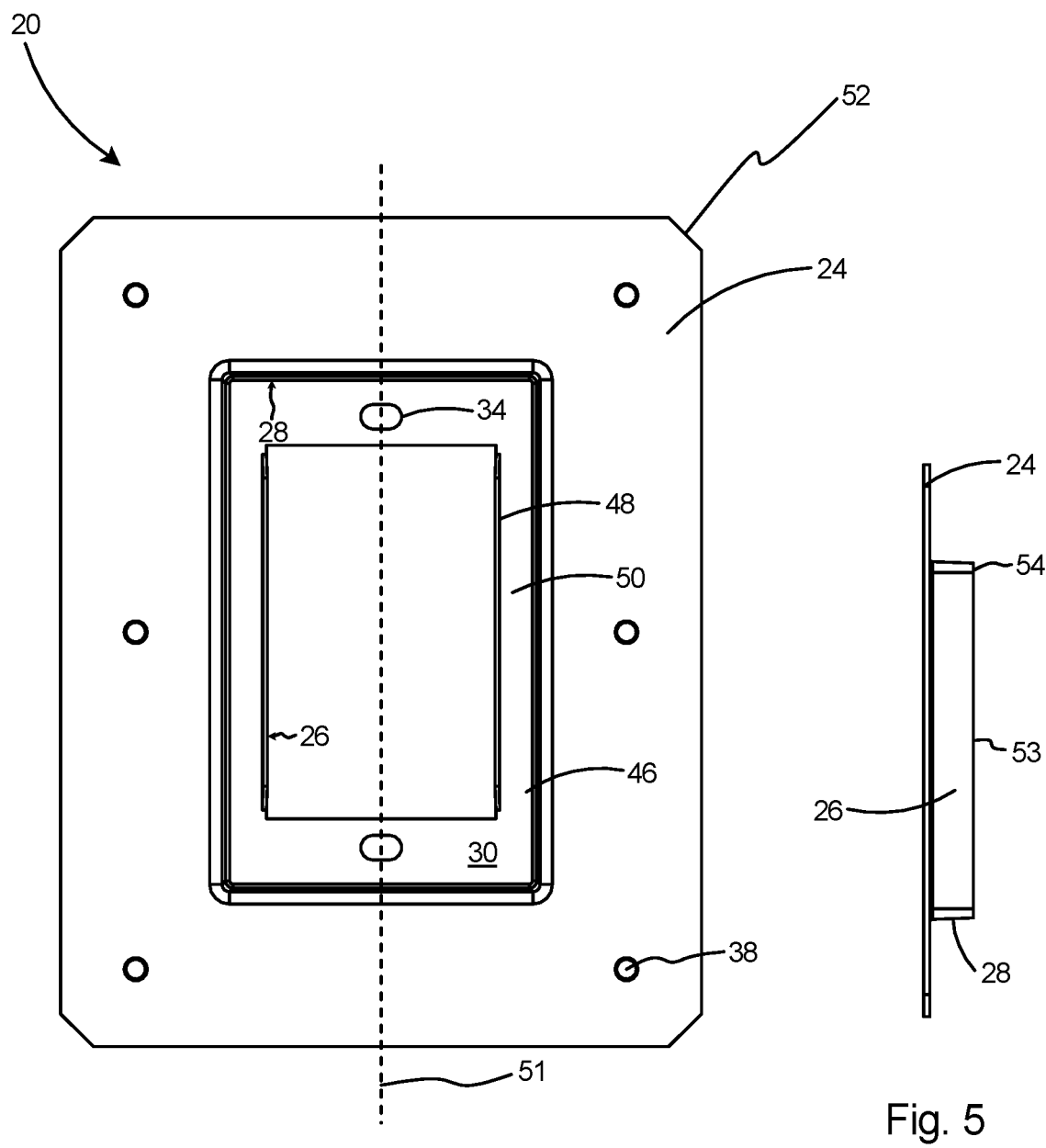
FIG. 4 is a rear elevation view of the vapor barrier cover.
FIG. 5 is a side view of the vapor barrier cover.

As shown in FIG. 3, inner apertures 34 and flashed-over apertures 36 are preferably in linear alignment, such as along axis 51, and preferably are centered on the front wall 30. The flange 24 may include truncated edges 52 as shown. As shown in FIG. 5, the rear edges 54 of the side walls 26 and end walls 28 of the vapor barrier cover 20 are planar and form a circumferential planar edge 53. The channel 46 includes a profile that matches the profile or shape of the front edge of the electrical box.

As shown in FIGS. 6 and 7, the wings 48 extend rearward from the front wall 30 and terminate in an edge 56 that is short of the flange and is planar with the rear face 40 of the flange 24. The meaning of the term "flashed-over aperture" as used herein refers to an aperture that does not pass all the way through the depth of the structure it is in. As an example, inner aperture 34 extends entirely through the front wall 30 whereas flashed-over aperture 36 does not extend all the way through the front wall. A thin skin 57 extends across the rear surface 44 of the front wall 30 at the flashed-over aperture 36. Thus flange 24 is a continuous flange extending from the walls 26 and 28 with no openings extending through the flange 24, the skinned over aperture will not be open unless purposely penetrated by the installer. The thin skin 57 can be penetrated by drilling or simply driving a screw through the skin. As shown in FIG. 7, the apertures 38 provided around the perimeter of the flange 24 are also preferably flashed-over apertures. As shown in FIG. 6, wing 48 includes a truncated edge 59, thus narrowing the wing 48 at the rear edge 56.

Figure 9:
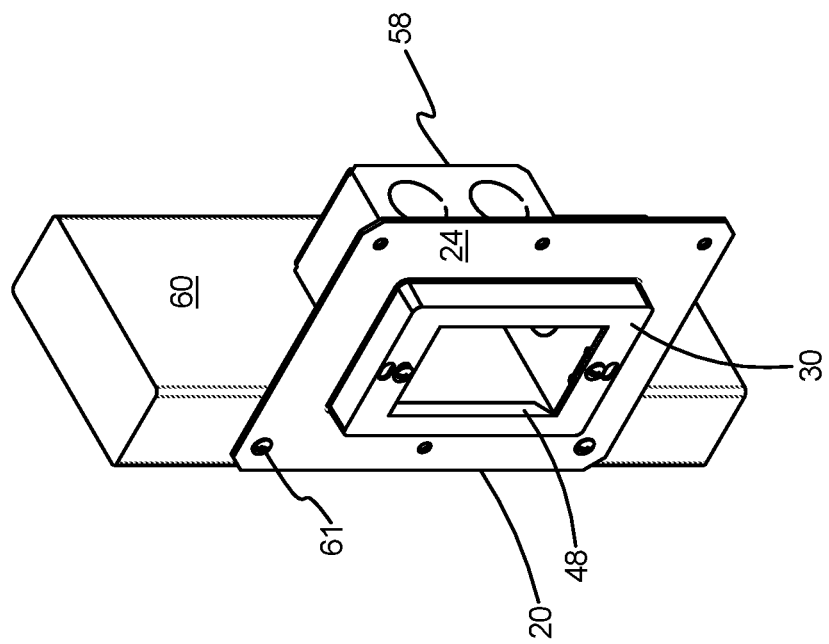
FIG. 9 is an isometric view of the vapor barrier cover secured to a framing member at the end of the rough-in stage.
Figure 8:
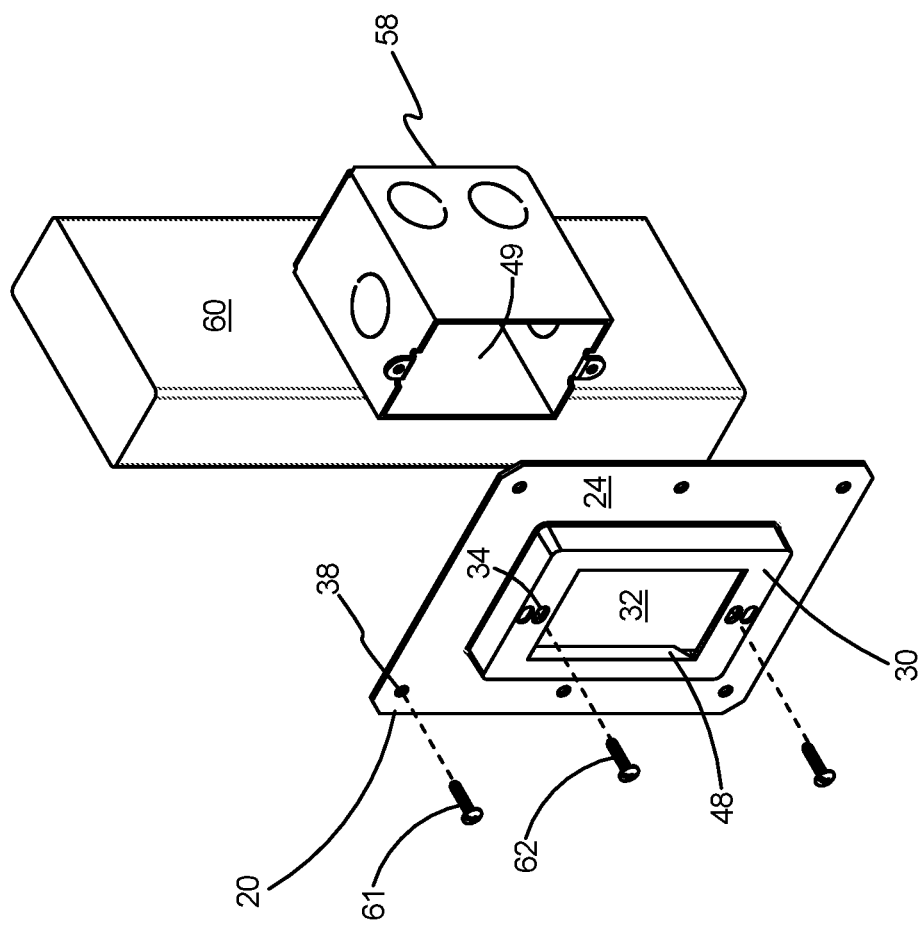
FIG. 8 is an exploded isometric view of the vapor barrier cover during the rough-in stage of electrical installation.

With reference to FIGS. 8 and 9, in the rough-in stage of construction of a house or similar structure, an outlet box 58 is typically mounted to a framing member 60. During rough-in of the house, the vapor barrier cover 20 can be secured to either by one or more fasteners 61 driven through the flashed-over apertures 38 in the flange 24 or, alternatively, use the supplied #6-32 screws to temporarily hold the vapor barrier cover in place during the installation of ½" or ⅝" drywall. Once the drywall is installed remove the #6-32 screws and install the device. The electrical box can then be secured to the framing member per the manufacturer's instructions. The wings 48 of the vapor barrier cover insert within the outlet box opening 49, thereby centering the vapor barrier cover 20 on the box and positioning the edges of the outlet box within the channel bottom 50 (see FIG. 4). The rough-in procedure positions the vapor barrier cover 20 on the framing member 60 and enables marking of the drywall for the location of a hole to align with the outlet box. The vapor barrier cover 20 can also be used in the same manner with a ceiling box (not shown) in the rough-in stage of construction.

Figure 10:
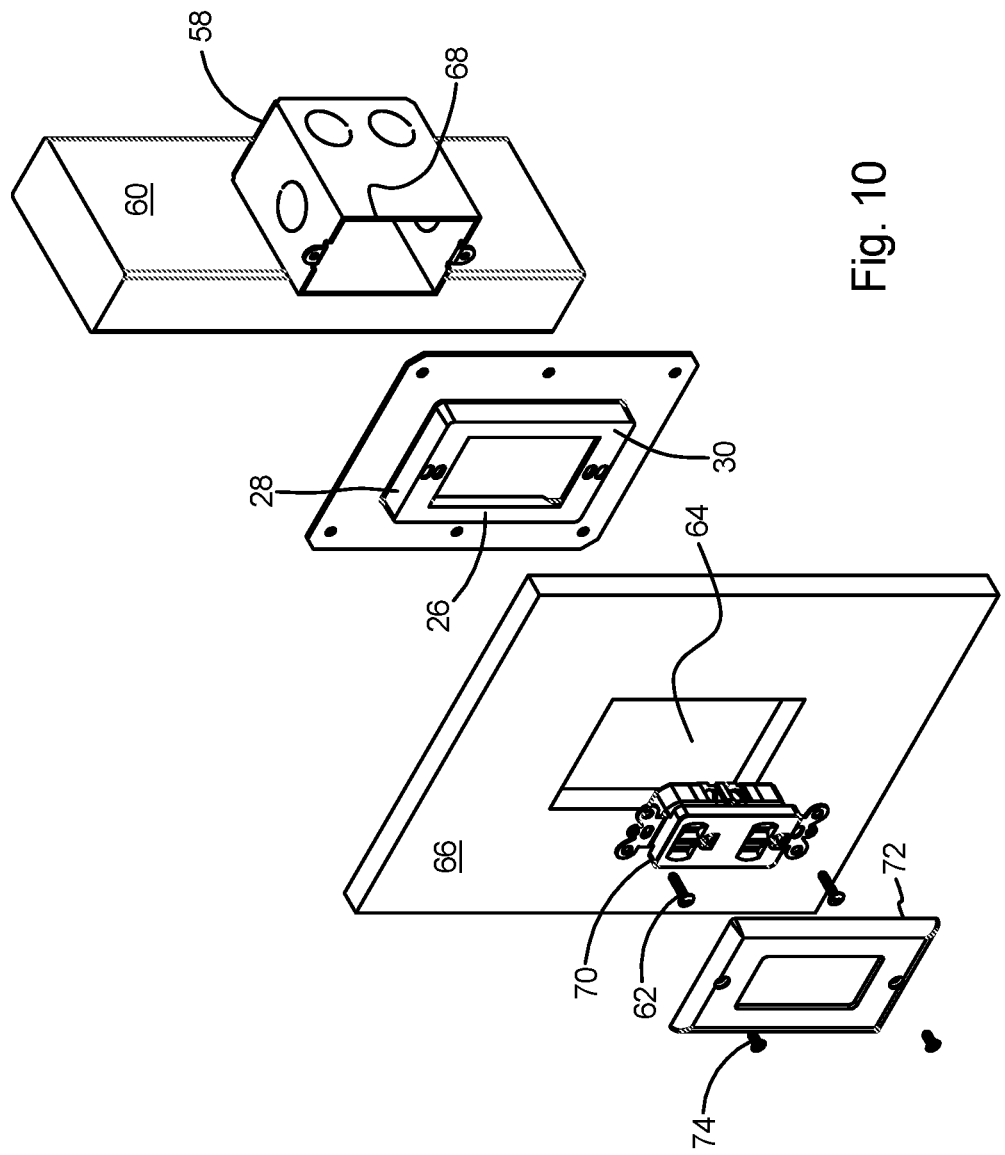
FIG. 10 is an exploded isometric view of the vapor barrier cover showing installation after the rough-in stage of house construction.
Figure 13:
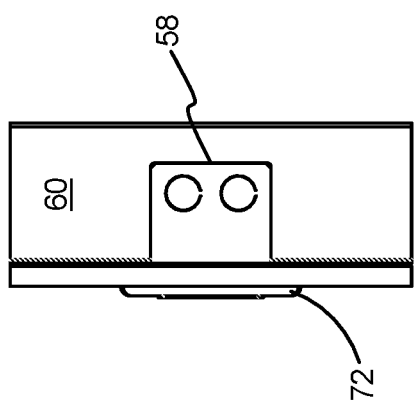
FIG. 13 is a side view of the finished installation of the vapor barrier cover.
Figure 14:
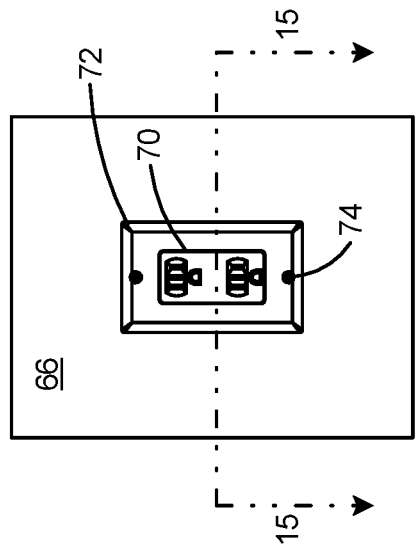
FIG. 14 is a front view of the finished installation of the vapor barrier cover.
Figure 11:
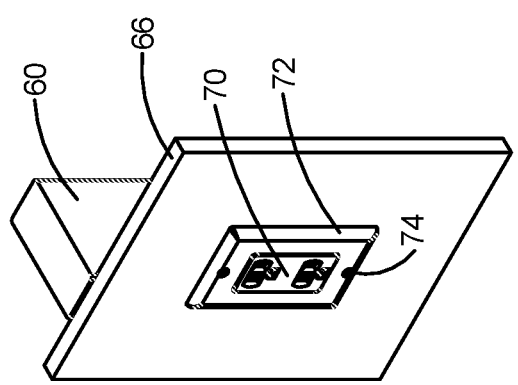
FIG. 11 is an isometric view of the finished installation of the vapor barrier cover.
Figure 12:
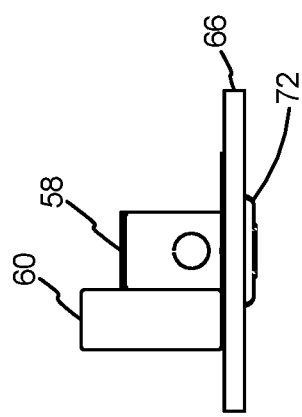
FIG. 12 is a top view of the finished installation of the vapor barrier cover.

Referring to FIG. 10, in the finishing phase of construction, a hole 64, of a size to accommodate insertion of the side walls 26 and end walls 28 of the vapor barrier cover, is cut in the drywall 66. The vapor barrier cover 20 creates an air-tight seal against the planar front edge 68 of the outlet box 58.

With reference to FIGS. 11-14, securing the drywall 66 to the framing members creates a flush, vapor barrier fit between the planar front surface 25 of the flange 24 and the drywall. After an electrical device such as a duplex receptacle 70 is secured to the outlet box, a conventional cover plate 72 is then secured to the receptacle 70 with screws 74.

Figure 15:
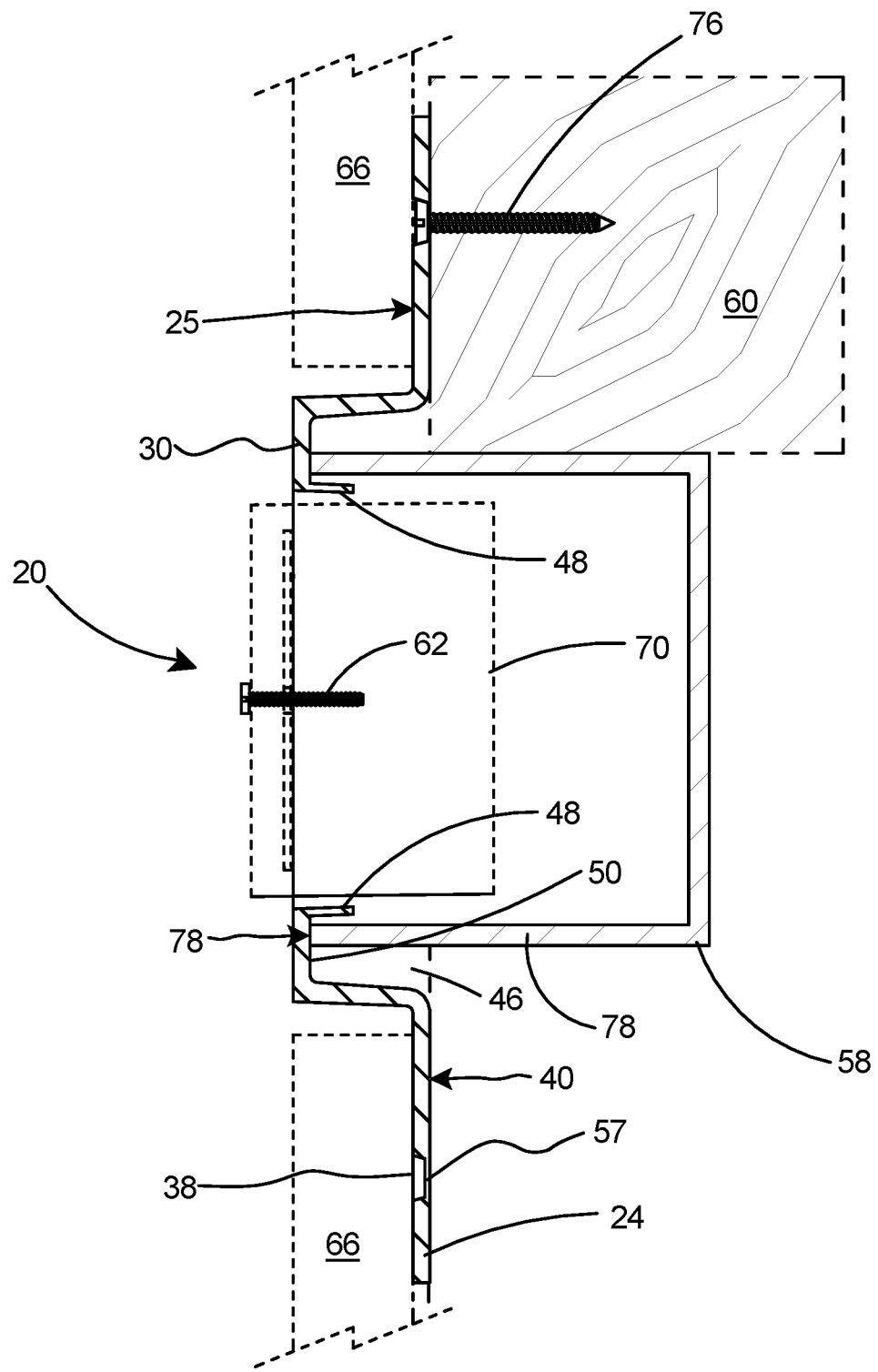
FIG. 15 is a sectional view taken along line 15-15 of FIG. 14 depicting the vapor barrier cover of the invention secured to a stud and with an electrical outlet mounted in the electrical box.

Referring to FIG. 15, the vapor barrier cover is easy to install on most plastic or steel electrical boxes. During the rough-in phase of construction, the vapor barrier cover 20 is centered over a mounted outlet box 58 and secured to a framing member 60 by one or more fasteners 76 through flashed-over apertures 38 in the flange 24, or alternatively by temporarily securing the vapor box cover to the outlet box 58 using the mounting screws 62 supplied with the vapor box cover, one of which is in view in FIG. 15. Drywall 66 is then cut with openings corresponding to each mounted outlet box 58 and is secured to the framing members 60. After drywall 66 is secured to the framing member 60 it forms a flush air-tight seal against the front face 25 of the flange 24. The electrical device 70 is then secured to the outlet box. The channel bottom 50 of the vapor barrier cover 20 seals against the front edge 78 of the outlet box 58 and prevents air infiltration between the outlet box and the drywall 66.

The vapor barrier cover 20 may be constructed of metal or plastic. Most preferably, the vapor barrier cover 20 is molded in one piece of nylon or polyvinyl chloride (PVC).

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A vapor barrier cover for reducing air infiltration around an electrical box, comprising:
   a flange with an opening having an inner periphery, said flange including a rear face;
   a body extending from the inner periphery of the flange; said body including side walls and end walls extending to a front edge;
   a front wall extending inward from said front edge, said front wall including a back surface;
   said front wall including a front opening therein;
   a wing extending from the front wall, said wing including a rear edge; and
   a truncated edge on said wing, said truncated edge narrowing the wing at the rear edge.

2. The vapor barrier cover of claim 1, comprising a channel defined by the side walls, the end walls, and the front wall of said body.

3. The vapor barrier cover of claim 1, comprising an inner aperture and a flashed-over aperture on the front wall, said flashed-over aperture passing partially through the front wall toward the back surface.

4. The vapor barrier cover of claim 3, comprising said a thin skin extending across the back surface of the front wall at the flashed-over aperture.

5. A vapor barrier cover for reducing air infiltration around an electrical box, comprising:
- a flange with an opening having an inner periphery, said flange including a rear face;
- a body extending from the inner periphery of the flange;
- said body including side walls and end walls extending to a front edge;
- a front wall extending inward from said front edge, said front wall including a back surface;
- said front wall including a front opening therein;
- an inner aperture and a flashed-over aperture on the front wall;
- said flashed-over aperture passing partially through the front wall toward the back surface; and
- a thin skin extending across the back surface of the front wall at the flashed-over aperture.

6. The vapor barrier cover of claim 5, comprising:
- a wing extending from the front wall, said wing including a rear edge; and
- a truncated edge on said wing, said truncated edge narrowing the wing at the rear edge.

* * * * *